United States Patent
Shropshire

(10) Patent No.: US 12,251,796 B2
(45) Date of Patent: Mar. 18, 2025

(54) LINEMAN'S SOCKET

(71) Applicant: MADI, LLC, Greenville, SC (US)

(72) Inventor: Aaron Shropshire, Hedgesville, WV (US)

(73) Assignee: MADI, LLC, Greenville, SC (US)

( * ) Notice: Subject to any disclaimer, the term of this patent is extended or adjusted under 35 U.S.C. 154(b) by 362 days.

(21) Appl. No.: 17/830,553

(22) Filed: Jun. 2, 2022

(65) Prior Publication Data
US 2022/0388128 A1    Dec. 8, 2022

Related U.S. Application Data

(60) Provisional application No. 63/196,289, filed on Jun. 3, 2021.

(51) Int. Cl.
   | | |
   |---|---|
   | *B25B 13/50* | (2006.01) |
   | *B25B 23/00* | (2006.01) |
   | *H02G 1/02* | (2006.01) |

(52) U.S. Cl.
   CPC .......... *B25B 13/50* (2013.01); *B25B 23/0035* (2013.01); *H02G 1/02* (2013.01)

(58) Field of Classification Search
   CPC ..... B25B 13/48; B25B 13/50; B25B 13/5091; B25B 23/0035; H02G 1/02
   See application file for complete search history.

(56) References Cited

U.S. PATENT DOCUMENTS

| | | | | |
|---|---|---|---|---|
| 1,867,372 | A * | 7/1932 | McGuckin | B25B 13/48 |
| | | | | 81/124.2 |
| 3,071,995 | A * | 1/1963 | Ruthrauff, Jr. | B25B 13/065 |
| | | | | 81/124.2 |
| 3,086,414 | A * | 4/1963 | Nardi | F16B 37/16 |
| | | | | 81/176.1 |
| 4,357,845 | A * | 11/1982 | Cornia | B25B 23/12 |
| | | | | 81/125 |
| D274,881 | S * | 7/1984 | Wilsey | D8/29 |
| 4,724,731 | A * | 2/1988 | Onofrio | B25B 23/00 |
| | | | | 81/124.2 |
| 4,823,650 | A * | 4/1989 | Tuttle | B25B 13/5091 |
| | | | | 81/176.15 |
| D434,291 | S * | 11/2000 | Kim | D8/21 |
| 6,314,841 | B1 * | 11/2001 | Burk | B25F 1/02 |
| | | | | 81/124.2 |
| 6,715,384 | B1 * | 4/2004 | Kozak | B25B 13/5091 |
| | | | | 81/176.15 |
| 7,802,499 | B2 * | 9/2010 | Stephens | B25B 13/065 |
| | | | | 81/125 |
| 7,878,093 | B1 * | 2/2011 | Peterman | B25B 13/5091 |
| | | | | 81/125 |
| 8,047,102 | B2 * | 11/2011 | Gnatz | B25B 13/06 |
| | | | | 7/165 |

(Continued)

*Primary Examiner* — David B. Thomas
(74) *Attorney, Agent, or Firm* — Shumaker, Loop & Kendrick, LLP; Brandon C. Trego

(57) ABSTRACT

A socket tool is disclosed. The socket tool includes a body extending between a first end and a second end and having a centerline along a longitudinal axis of the socket tool; a socket bounded by a peripheral wall and formed at the first end, the socket including a first driving element extending through the peripheral wall, bisecting the peripheral wall into first and second wall sections; and a drive recess at the second end of the body to receive a nose of a driving tool.

17 Claims, 8 Drawing Sheets

(56) References Cited

U.S. PATENT DOCUMENTS

| | | | | |
|---|---|---|---|---|
| 10,124,471 B2* | 11/2018 | Sturner | ............... | B25B 13/5091 |
| 10,193,246 B1* | 1/2019 | White | ....................... | H01R 4/44 |
| 11,247,312 B2* | 2/2022 | Attebury | ............... | B25B 13/065 |
| 11,407,088 B2* | 8/2022 | Gimondo | ............ | B25B 13/5091 |
| 2008/0011128 A1* | 1/2008 | Stephens | ................. | B25B 23/12 |
| | | | | 81/124.2 |
| 2010/0064859 A1* | 3/2010 | Stephens | ............. | B25B 13/5091 |
| | | | | 81/125 |
| 2012/0085665 A1* | 4/2012 | Gnatz | ................. | B25B 13/5091 |
| | | | | 206/230 |
| 2021/0316421 A1* | 10/2021 | Gimondo | ............ | B25B 13/5091 |

* cited by examiner

LINEMAN'S SOCKET

BACKGROUND OF THE INVENTION

This invention relates generally to a fastener driving tool, and more particularly to a socket for use by utility workers.

Utility workers (e.g., "linemen") frequently carry out installation, maintenance, or repair on electrical transmission or distribution equipment in the field. This work involves removing and installing numerous shapes and sizes of fasteners and connections such as nuts, bolts, and threaded hooks and eyes.

There is a need for utility workers to have the appropriate tools available at hand while minimizing the number of separate tools to be transported and the likelihood of losing tools.

BRIEF SUMMARY OF THE INVENTION

This need is addressed by the present invention, which provides a socket suitable for driving multiple sizes of fasteners and connections.

According to one aspect of the invention, a socket tool includes a body extending between a first end and a second end and having a centerline along a longitudinal axis of the socket tool; a socket bounded by a peripheral wall and formed at the first end, the socket including a first driving element extending through the peripheral wall, bisecting the peripheral wall into first and second wall sections; and a drive recess at the second end of the body to receive a nose of a driving tool.

According to another aspect of the invention, a socket tool includes a body extending between a first end and a second end and having a centerline along a longitudinal axis of the socket tool; a socket bounded by a peripheral wall and formed at the first end, the socket including: a first driving element extending through the peripheral wall, bisecting the peripheral wall into first and second wall sections; a second driving element positioned adjacent to an end face of the socket; and a third driving element extending axially inward from the first driving element; and a drive recess at the second end of the body to receive a nose of a driving tool.

According to another aspect of the invention, a socket tool includes a body extending between a first end and a second end and having a centerline along a longitudinal axis of the socket tool; a socket bounded by a peripheral wall and formed at the first end, the socket including: a pair of outer cross slots that extend axially inward from an end face of the socket, each of the outer cross slots being bounded by opposed, parallel side faces which blend into a concave, arcuate bottom face; two opposed triangular slots positioned adjacent the end face and formed in the peripheral wall of the socket, each of the triangular slots terminating at a bottom face that is oriented normal to the centerline; and a pair of inner cross slots, each of the inner cross slots extending axially inward from a respective one of the bottom faces of the first driving element, each of the inner cross slots being bounded by opposed, parallel side faces which blend into concave, arcuate bottom faces oriented at an acute angle to the centerline; and a drive recess at the second end of the body to receive a nose of a driving tool.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
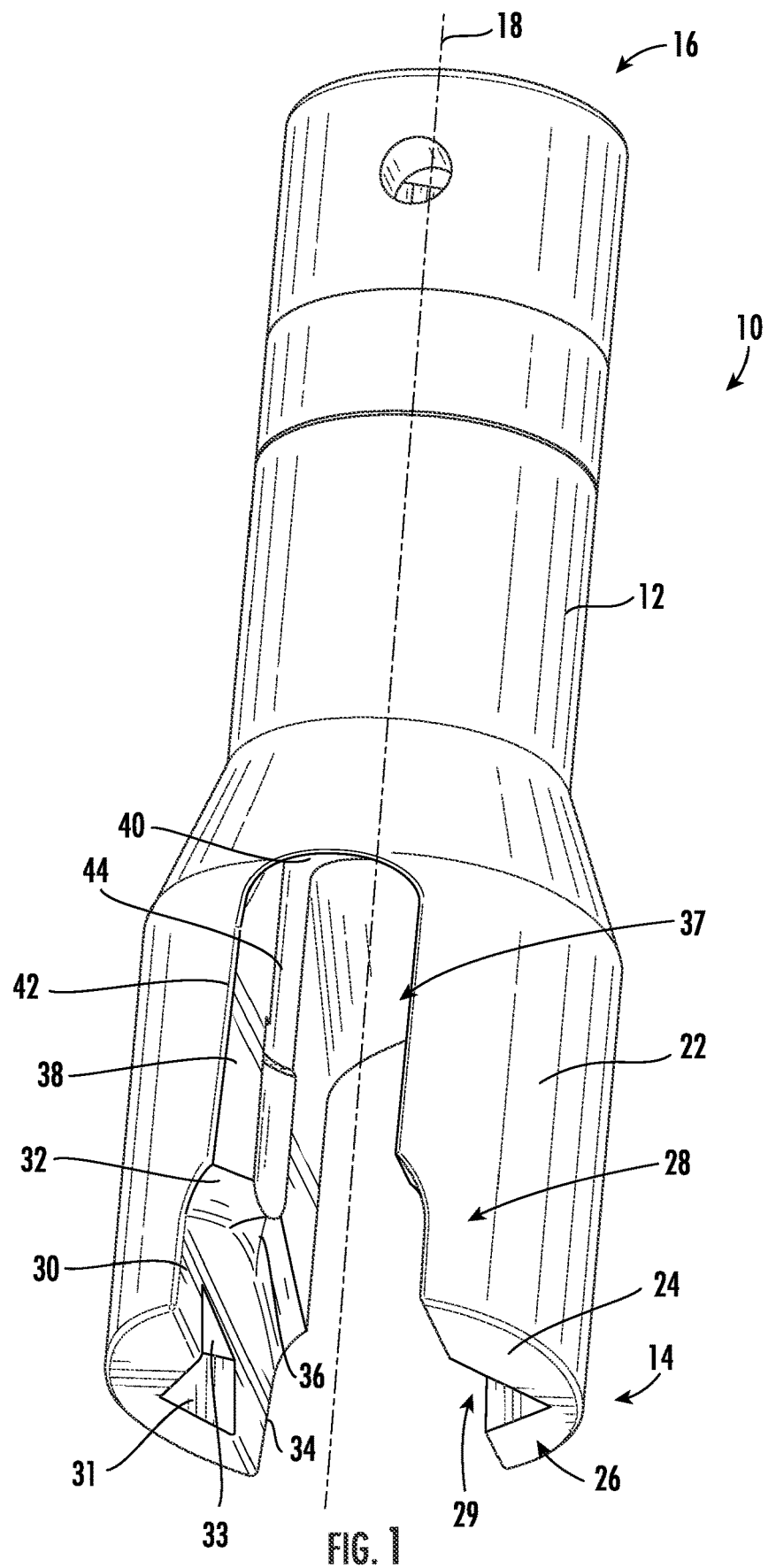
FIG. 1 is a bottom perspective view of a lineman socket according to an exemplary embodiment of the present invention.

Referring to the drawings wherein identical reference numerals denote the same elements throughout the various views, FIGS. 1-9 illustrate an exemplary socket tool 10.

The socket tool 10 is a unitary element with a body 12 extending between first and second ends 14, 16. For reference, a centerline 18 extends through the longitudinal axis of the socket tool 10. The socket tool 10 could be made by forging, casting, machining from solid stock or the like. It may be made from any material having suitable strength such as a metal alloy. Alternatively, plastics or composites could be employed depending on the specific end use.

Figure 7:
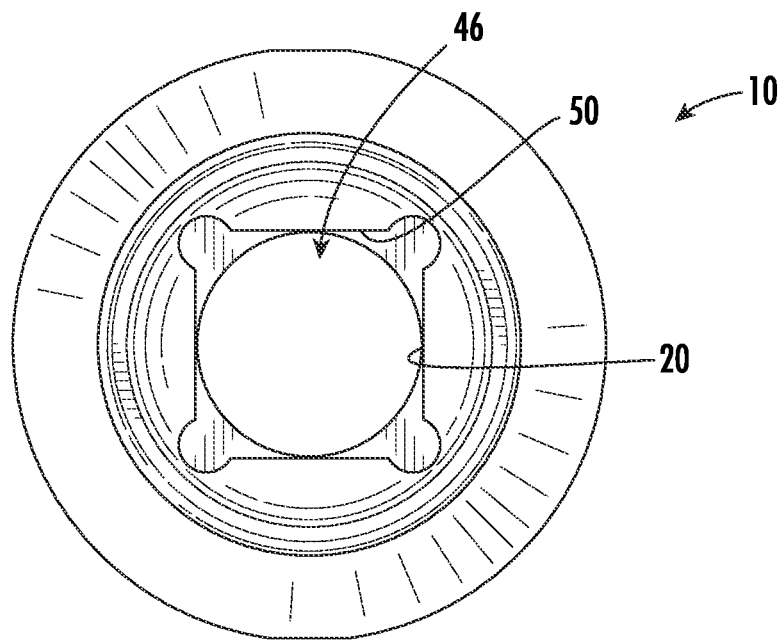
FIG. 7 is a top view of the lineman socket of FIG. 1.
Figure 8:
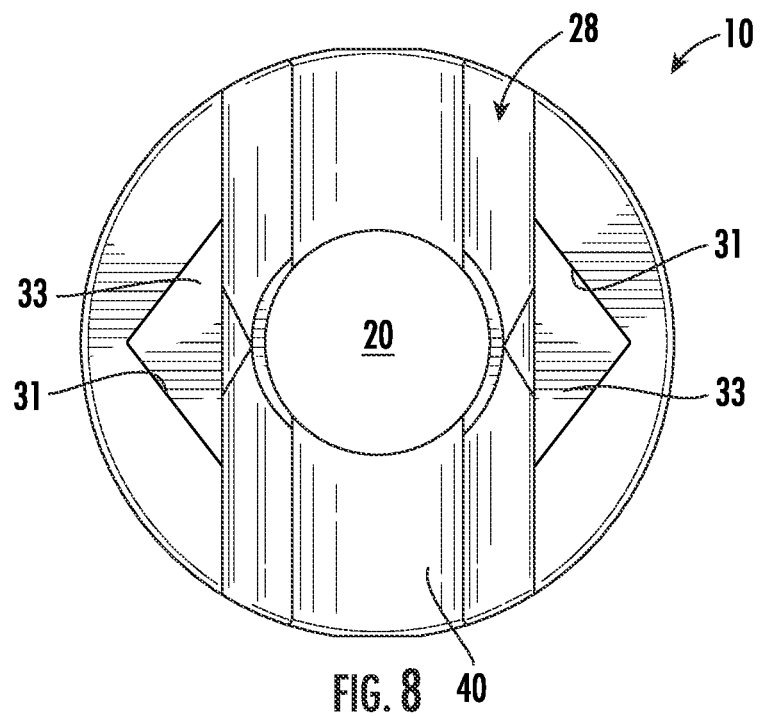
FIG. 8 is a bottom view of the lineman socket of FIG. 1.
Figure 9:
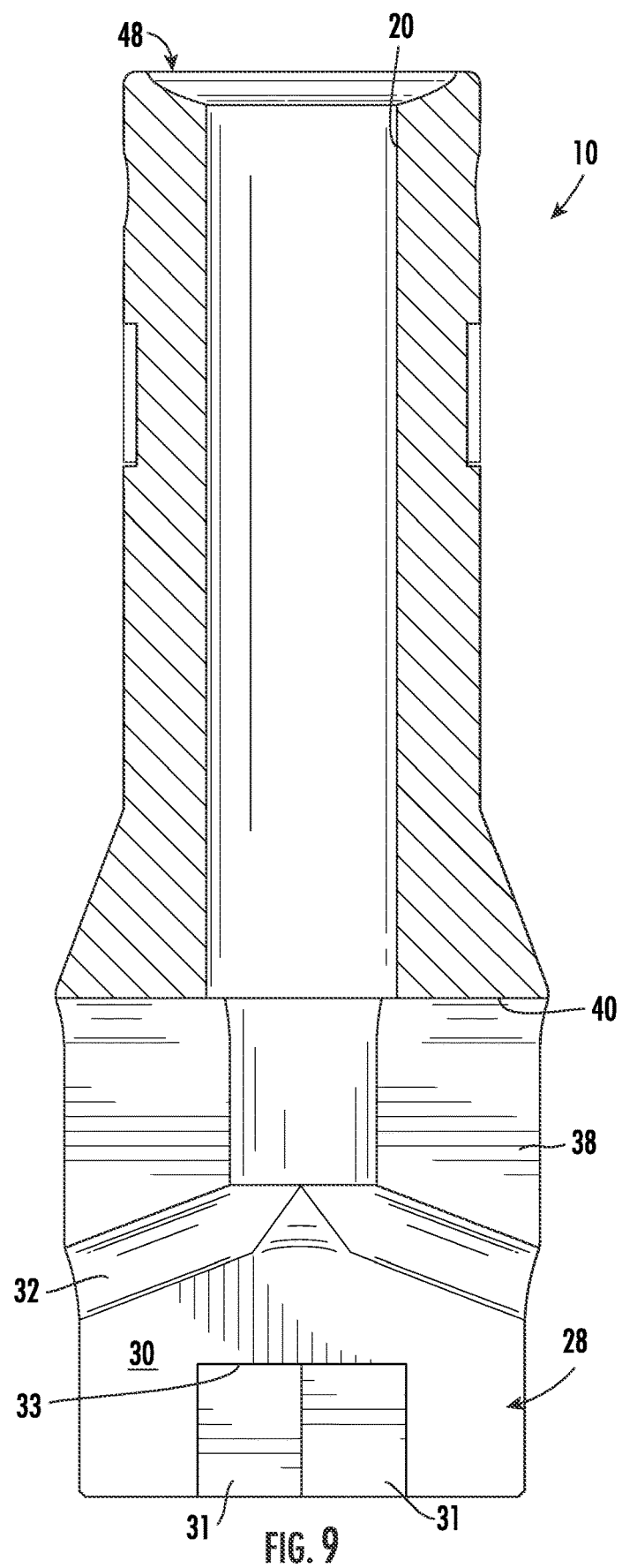
FIG. 9 is a cross-sectional view of the lineman socket of FIG. 1.

In the illustrated example the body 12 is hollow with a central through-bore 20 (FIG. 7). Alternatively, it could be of solid construction. In this example the exterior surface is cylindrical. Other shapes such as polygons could be used.

A socket 22 is formed at the first end 14. The socket 22 is bounded by a peripheral wall 24 that terminates at an end face 26 oriented normal to the centerline 18. The interior of the socket 22 includes numerous surfaces which define structural elements for driving different kinds of fasteners. These structures may be referred to as "driving elements".

One driving element is a pair of outer cross slots 28 that extend axially inward from the end face 26 and pass through the peripheral wall 24, bisecting the peripheral wall 24 into two sections. Each of the outer cross slots 28 is bounded by opposed, parallel side faces 30 which blend into a concave, arcuate bottom face 32. The bottom faces 32 are "angled". More specifically, the bottom faces 32 are oriented at an acute angle to the centerline 18, such that the outboard edge 34 of each cross slot 28 is closer to the end face 26 than the inboard edge 36 of the cross slot 28. It is noted that the bottom faces 32 are bisected by inner cross slots, described below.

The outer cross slots 28 are useful for driving fasteners or objects extending in a transverse direction, such as T-handles. The angled orientation is also helpful in engaging rounded fasteners such as eye bolts and hooks.

Another driving element is an outer square drive recess 29 that is positioned adjacent the end face 26. This is defined by two opposed triangular slots 31 formed in the peripheral wall 24. Each triangular slot 31 terminates at a bottom face 33 that is oriented normal to the centerline 18.

The outer square drive recess 29 is useful for driving fasteners such as nuts and bolts. In one example, the outer square drive recess 29 can be sized for engaging and driving square nuts having outside dimensions of approximately 19 mm (¾ in.). It can also be used to drive fasteners such as hooks and eyes.

Another driving element is a pair of inner cross slots 37 that extend axially inward from the bottom faces 32 of the outer cross slots 28. Each of the inner cross slots 37 is bounded by opposed, parallel side faces 38 which blend into a concave, arcuate bottom face 40. The bottom faces 40 are "angled". More specifically, the bottom faces 40 are oriented at an acute angle to the centerline 18, such that the outboard edge 42 of each inner cross slot 37 is closer to the end face 26 than the inboard edge 44 of the inner cross slot 37.

The inner cross slots 37 are useful for driving fasteners or objects extending in a transverse direction, such as T-handles. As illustrated, they may have a different width, e.g. narrower, than the outer cross slots 28. The angled orientation is also helpful in engaging rounded fasteners such as eye bolts and hooks.

Figure 2:
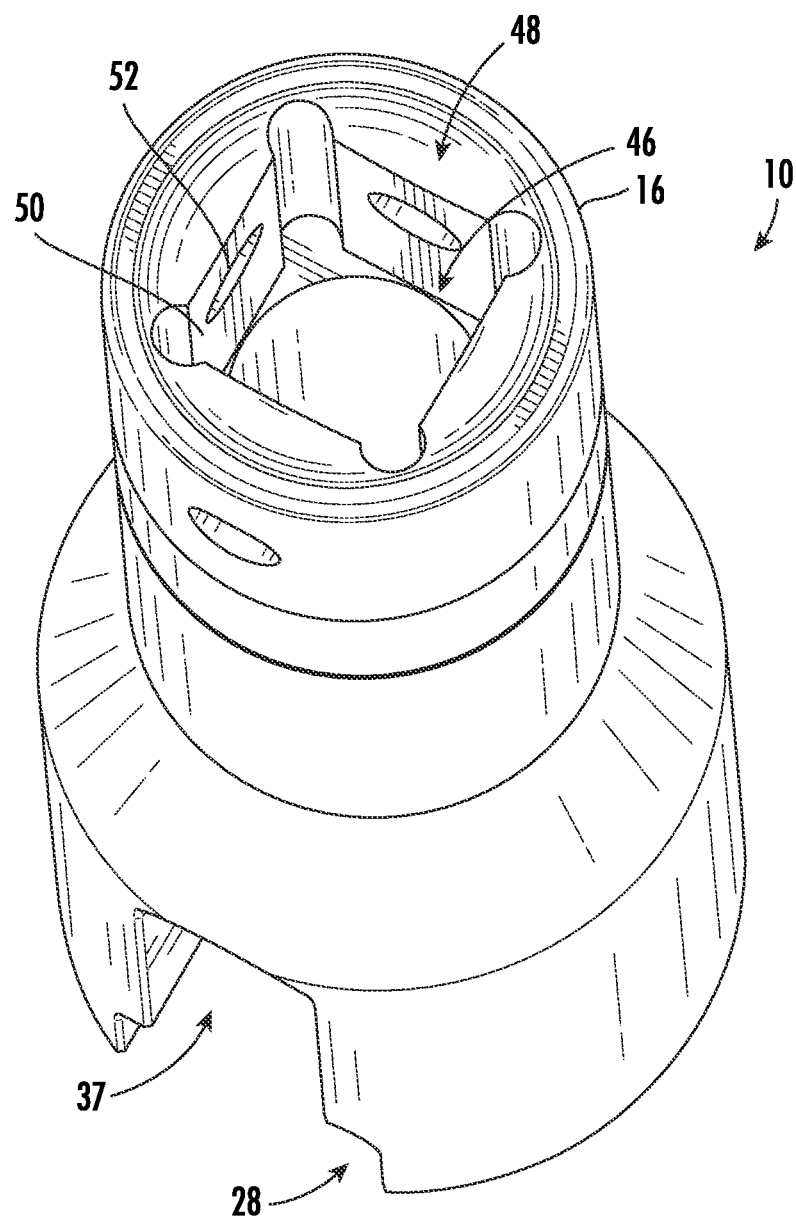
FIG. 2 is a top perspective view of the lineman socket of FIG. 1.
Figure 3:
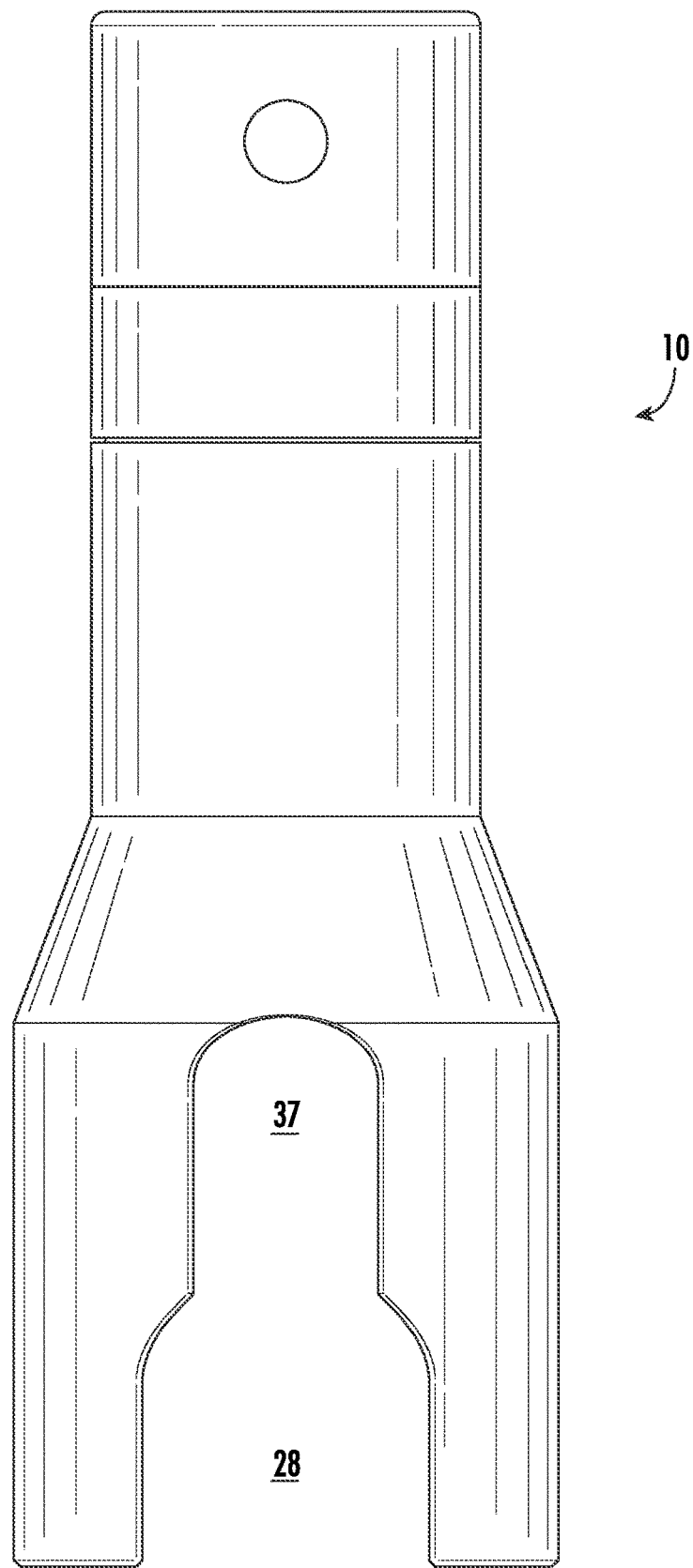
FIG. 3 is a right side elevation of the lineman socket of FIG. 1.
Figure 4:
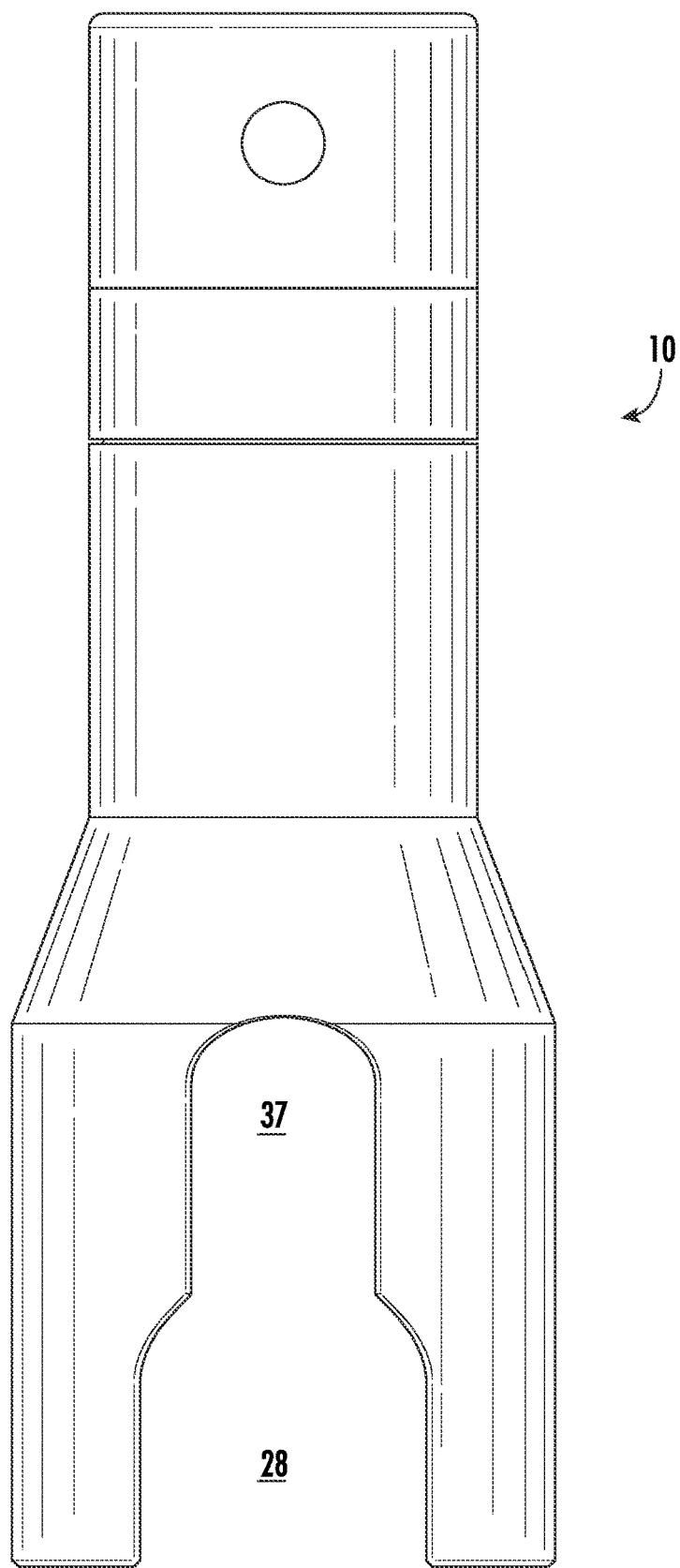
FIG. 4 is a left side elevation of the lineman socket of FIG. 1.
Figure 5:
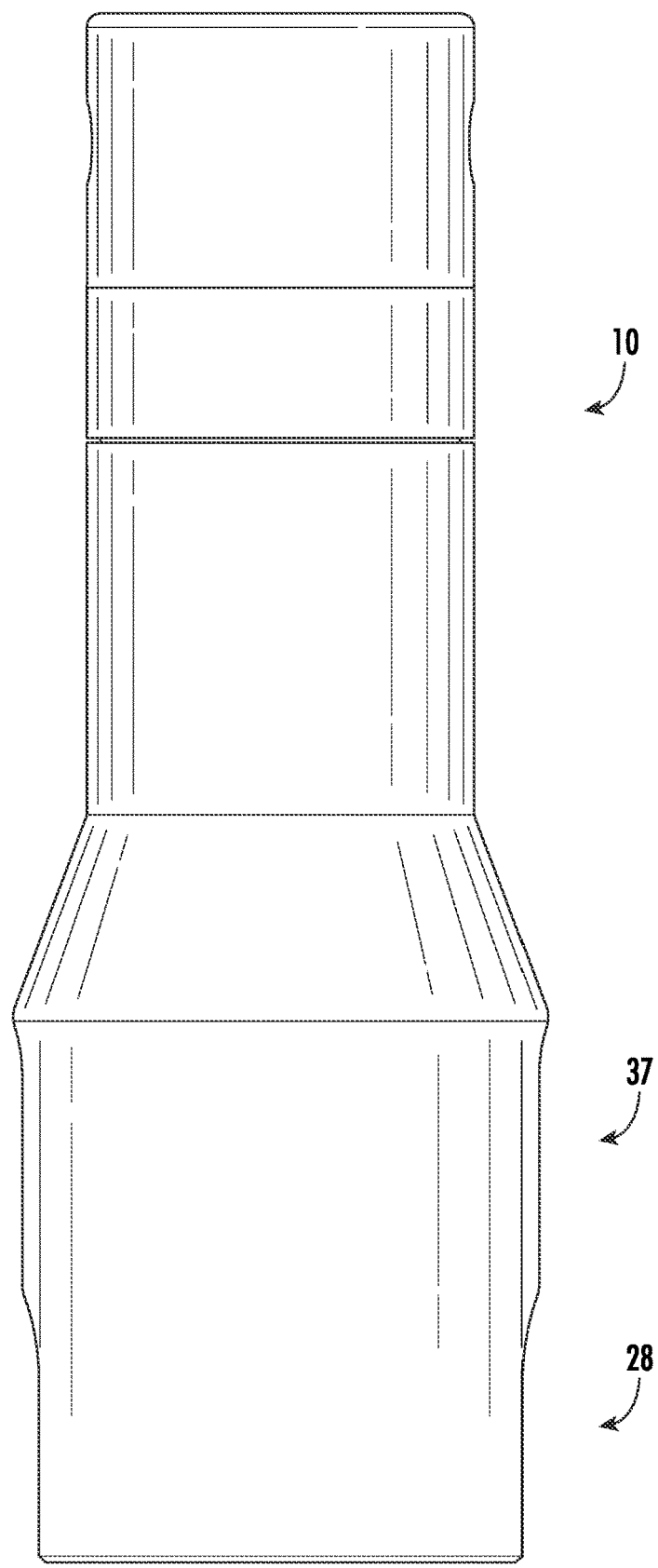
FIG. 5 is a front elevation of the lineman socket of FIG. 1.
Figure 6:
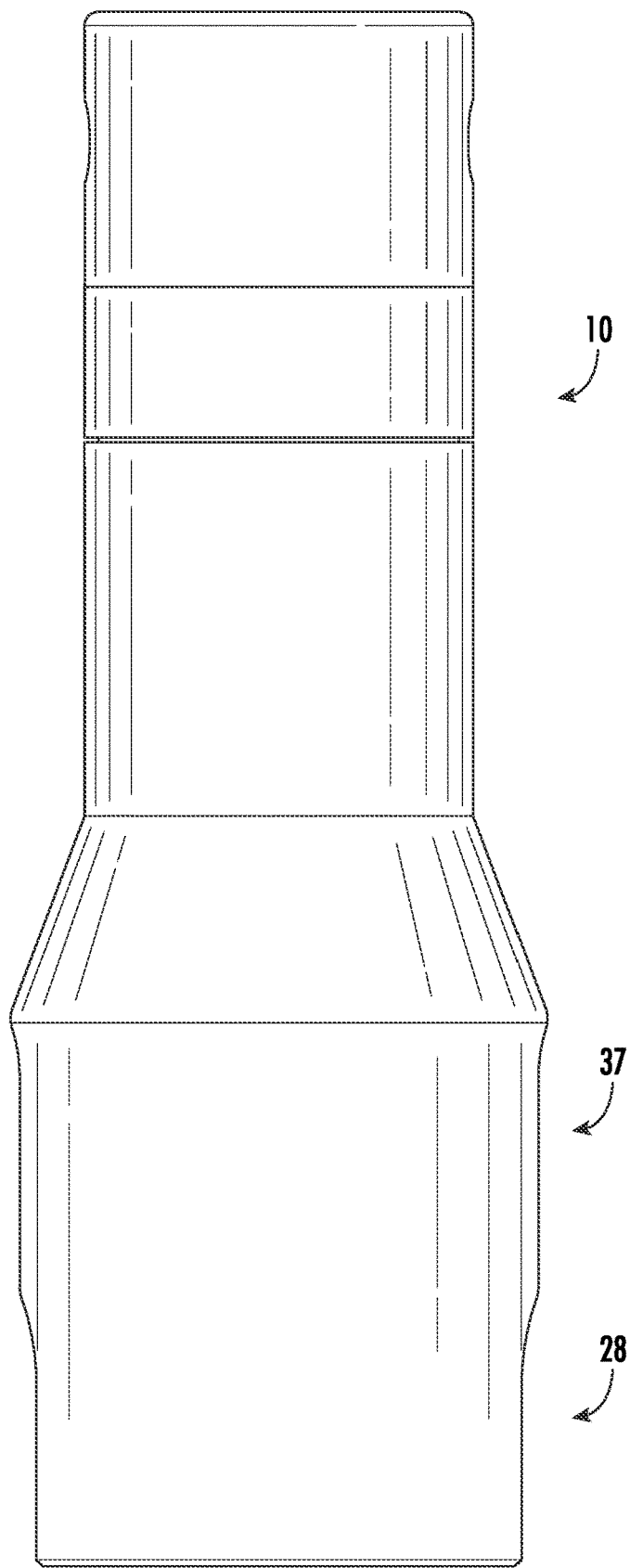
FIG. 6 is a rear elevation of the lineman socket of FIG. 1.

Referring to FIG. 2, the second end 16 incorporates a square drive recess 46 positioned adjacent an end face 48. This is defined by four flat faces 50 arranged in two pairs of parallel faces. The square drive recess 16 adjoins the through-bore 20. One or more lock ball holes 52 may be formed in the faces 50. The square drive recess 46 is sized to accept the nose of a conventional driving tool such as a ratchet, drill-driver, or impact driver (not shown).

The socket tool 10 as described herein as the advantage of providing a portable, compact driving tool for multiple sizes of fasteners all in one tool. This is more convenient than carrying multiple tools and greatly reduces the chances of one or more tools being lost.

The foregoing has described a socket tool. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A socket tool, comprising:
   a body extending between a first end and a second end and having a centerline along a longitudinal axis of the socket tool;
   a socket bounded by a peripheral wall and formed at the first end, the socket including:
      a first driving element extending through the peripheral wall, bisecting the peripheral wall into first and second wall sections, the first driving element extending axially inward from an end face of the socket and is bounded by opposed, parallel side faces which blend into concave, arcuate bottom faces; and
      a second driving element positioned adjacent to the end face, the second driving element being defined by two opposed triangular slots formed in the peripheral wall of the socket, each of the triangular slots terminating at a bottom face that is oriented normal to the centerline and positioned between the end face of the socket and the bottom faces of the first driving element; and
   a drive recess at the second end of the body to receive a nose of a driving tool.

2. The socket tool of claim 1, further including a central through-bore extending along the centerline.

3. The socket tool of claim 1, wherein the end face is oriented normal to the centerline.

4. The socket tool of claim 1, wherein the bottom faces of the first driving element are oriented at an acute angle to the centerline.

5. The socket tool of claim 4, further including a third driving element extending axially inward from the bottom faces of the first driving element.

6. The socket tool of claim 5, wherein the third driving element is bounded by opposed, parallel side faces which blend into concave, arcuate bottom faces.

7. The socket tool of claim 6, wherein the bottom faces are oriented at an acute angle to the centerline.

8. The socket tool of claim 7, wherein each of the inner cross slots are bounded by opposed, parallel side faces which blend into concave, arcuate bottom faces that are oriented at an acute angle to the centerline.

9. The socket tool of claim 1, wherein the peripheral wall terminates at the end face.

10. The socket tool of claim 1, wherein the first driving element is a pair of outer cross slots that extend axially inward from an end face of the socket.

11. The socket tool of claim 10, further including a third driving element, the third driving element having a pair of inner cross slots, each of the inner cross slots extending axially inward from a respective one of the bottom faces of the first driving element.

12. A socket tool, comprising:
    a body extending between a first end and a second end and having a centerline along a longitudinal axis of the socket tool;
    a socket bounded by a peripheral wall and formed at the first end, the socket including:
       a first driving element extending through the peripheral wall, bisecting the peripheral wall into first and second wall sections, the first driving element extending axially inward from an end face of the socket to concave, arcuate bottom faces;
       a second driving element positioned adjacent to the end face of the socket, the second driving element being defined by two opposed triangular slots formed in the peripheral wall of the socket, each of the triangular slots terminating at a bottom face that is oriented normal to the centerline and positioned between the end face of the socket and the bottom faces of the first driving element; and
       a third driving element extending axially inward from the first driving element; and
    a drive recess at the second end of the body to receive a nose of a driving tool.

13. The socket tool of claim 12, wherein the first driving element is a pair of outer cross slots that extend axially inward from the end face of the socket, each of the outer cross slots being bounded by opposed, parallel side faces which blend into the concave, arcuate bottom faces.

14. The socket tool of claim 12, wherein the third driving element includes a pair of inner cross slots, each of the inner cross slots extending axially inward from a respective one of the bottom faces of the first driving element, each of the inner cross slots being bounded by opposed, parallel side faces which blend into concave, arcuate bottom faces oriented at an acute angle to the centerline.

15. A socket tool, comprising:
- a body extending between a first end and a second end and having a centerline along a longitudinal axis of the socket tool;
- a socket bounded by a peripheral wall and formed at the first end, the socket including:
  - a pair of outer cross slots that extend axially inward from an end face of the socket, each of the outer cross slots being bounded by opposed, parallel side faces which blend into concave, arcuate bottom faces;
  - two opposed triangular slots positioned adjacent the end face and formed in the peripheral wall of the socket, each of the triangular slots terminating at a bottom face that is oriented normal to the centerline and positioned between the end face of the socket and the bottom faces of the first driving element; and
  - a pair of inner cross slots, each of the inner cross slots extending axially inward from a respective one of the bottom faces of the first driving element, each of the inner cross slots being bounded by opposed, parallel side faces which blend into concave, arcuate bottom faces oriented at an acute angle to the centerline; and
- a drive recess at the second end of the body to receive a nose of a driving tool.

16. The socket tool of claim 15, wherein each of the bottom faces of the outer cross slots is oriented at an acute angle to the centerline such that an outboard edge of each outer cross slot is closer to the end face than an inboard edge.

17. The socket tool of claim 15, wherein each of the bottom faces of the inner cross slots is oriented at an acute angle to the centerline such that an outboard edge of each inner cross slot is closer to the end face than an inboard edge.

\* \* \* \* \*